(12) United States Patent
Nara et al.

(10) Patent No.: US 9,133,556 B2
(45) Date of Patent: Sep. 15, 2015

(54) ACTIVATED CATHODE FOR HYDROGEN EVOLUTION

(75) Inventors: Miwako Nara, Kanagawa (JP); Eri Miyakawa, Kanagawa (JP); Yoshinori Nishiki, Kanagawa (JP)

(73) Assignee: PERMELEC ELECTRODE LTD., Kanagawa (JP)

(*) Notice: Subject to any disclaimer, the term of this patent is extended or adjusted under 35 U.S.C. 154(b) by 318 days.

(21) Appl. No.: 13/576,811

(22) PCT Filed: Jan. 18, 2011

(86) PCT No.: PCT/JP2011/051160
§ 371 (c)(1),
(2), (4) Date: Aug. 2, 2012

(87) PCT Pub. No.: WO2011/099350
PCT Pub. Date: Aug. 18, 2011

(65) Prior Publication Data
US 2012/0305389 A1   Dec. 6, 2012

(30) Foreign Application Priority Data

Feb. 10, 2010   (JP) ................... 2010-028133
Nov. 4, 2010    (JP) ................... 2010-247793

(51) Int. Cl.
*C25B 11/00* (2006.01)
*C25B 11/04* (2006.01)

(52) U.S. Cl.
CPC ......... *C25B 11/0494* (2013.01); *C25B 11/0484* (2013.01); *Y02E 60/366* (2013.01)

(58) Field of Classification Search
CPC .............. C25B 1/02; C25B 1/04; C25B 1/25; C25B 1/34; C25B 11/0484; C25B 11/0494; C25B 11/0478; B01J 23/10; B01J 23/42; B01J 23/44

USPC ................ 204/280, 292, 293, 290.14, 290.1; 205/637, 638, 621, 639; 502/103, 113, 502/117, 303, 304, 339
See application file for complete search history.

(56) References Cited

U.S. PATENT DOCUMENTS 4,801,368 A   1/1989   Yamashita et al.
5,035,779 A   7/1991   Nishiki et al.
(Continued)

FOREIGN PATENT DOCUMENTS

JP   63-230894   9/1988
JP   64-8288     1/1989
(Continued)

OTHER PUBLICATIONS

H. Wendt and V. Plzak: "Electrocatalysis and Electrocatalysts for Cathodic Evolution and Anodic Oxidation of Hydrogen"; Electrochemical Hydrogen Technologies pp. 15-62 (1990).
(Continued)

*Primary Examiner* — Luan Van
*Assistant Examiner* — Alexander W Keeling
(74) *Attorney, Agent, or Firm* — Hamre, Schumann, Mueller & Larson, P.C.

(57) ABSTRACT

The present invention aims to provide an activated cathode enabling a long-time stable operation with hydrogen overvoltage maintained at a low value, keeping a high remaining rate of the catalyst element after a cease of operation for a short-circuiting and after an electrolysis operation at a high current density, restricting catalyst loss to a little, and having a strong resistance to contamination caused by electrolyte impurity elements.

The present invention relates to a cathode for hydrogen evolution with a catalyst layer formed on the cathode substrate, having, at least, three elements comprising platinum, cerium and palladium, as essential element, in a state of metal, metal oxide, or hydroxide, contained, where the mole fraction of respective element being x, y, and z, within a range of 5 mol %≤x≤90 mol %, 5 mol %≤y≤55 mol %, 5 mol %≤z≤65 mol %.

6 Claims, 1 Drawing Sheet

(56) References Cited

U.S. PATENT DOCUMENTS

| | | | |
|---|---|---|---|
| 7,122,219 B2 | 10/2006 | Houda et al. | |
| 7,943,020 B2 * | 5/2011 | Antozzi et al. | 204/290.14 |
| 7,959,774 B2 * | 6/2011 | Nara et al. | 204/290.1 |

FOREIGN PATENT DOCUMENTS

| | | |
|---|---|---|
| JP | 6-33481 B | 5/1994 |
| JP | 6-33492 B | 5/1994 |
| JP | 2000-239882 | 9/2000 |
| JP | 2005-139541 | 6/2005 |
| JP | 2005-330575 | 12/2005 |
| JP | 2006-118022 | 5/2006 |
| JP | 2006-118023 | 5/2006 |
| JP | 2006-193768 | 7/2006 |
| JP | 4142191 B2 | 8/2008 |
| JP | 4274489 B2 | 6/2009 |
| JP | 2009-215580 | 9/2009 |
| JP | 4341838 B2 | 10/2009 |
| JP | 4346070 B2 | 10/2009 |
| WO | WO 2008/043766 | 4/2008 |
| WO | WO 2011042484 A1 * | 4/2011 ................. 204/290.1 |

OTHER PUBLICATIONS

Yamaguchi et al.: "A Nickel-Based Composite Electroplated Cathode for the Membrane-Type Chlor-Alkali Cell"; J. Electrochem. Soc., vol. 137, No. 5, pp. 1419 (1990).

D.E. Grove: "Precious-metal activated cathodes for chlor-alkali cells"; Modern Chlor-Alkali Technology, vol. 3, pp. 250-262 (1986).

\* cited by examiner

ACTIVATED CATHODE FOR HYDROGEN EVOLUTION

TECHNICAL FIELD

The present invention relates to a cathode for hydrogen evolution, in particular, to an activated cathode for the hydrogen evolution best suited to industrial electrolyses, including chlor-alkali electrolysis.

BACKGROUND ART

Sodium hydroxide and chlorine that are important industrial materials are manufactured mainly by chlor-alkali electrolysis methods.

The present electrolysis process has progressed through a mercury process using a mercury cathode, a diaphragm process using an asbestos diaphragm and a soft iron cathode to an ion exchange membrane process using an ion exchange membrane as diaphragm and an activated cathode involving small overvoltage. Through such transition periods, the power consumption for manufacturing one ton of caustic soda has decreased to 2000 kWh.

An activated cathode for hydrogen evolution is obtained, for instance, by the following methods and materials: the method to obtain an active electrode by composite plating in Ni plating bath in which active carbon powder is dispersed; the method by Ni alloy plating from the plating bath containing a second element, like S or Sn; the method of activation by NiO plasma spray or Pt—Ru displacement plating for Ni surface; the method by porous Ni applying Raney nickel; the method by preparing a Ni—Mo alloy film by arc-ion plating process; and the method by impregnating hydrogen storage alloy to provide resistance to reverse electric current. (Refer to Non-Patent Literature 1.)

Recently, an electrolytic cell that can increase current density for the purpose of increasing production ability and decreasing an investment cost is now under development in an ion exchange membrane process. Development of a low resistance membrane enables large current to apply.

However, the cathode so far used has large surface unevenness and low mechanical strength of the catalyst layer, without established records about its life and performance as a cathode for the ion exchange membrane process. Then, the following requirements for improvements are raised. In order to realize a new process, it is essential to develop an activated cathode having high performance and sufficient stability even under the afore-mentioned electrolytic conditions. It is further required for the activated cathode to have a low overvoltage, not to impair a membrane by contacting and to be low contamination with, for example, metal ions from a cathode.

In the chlor-alkali process most generally conducted, an activated cathode for hydrogen evolution is arranged so as to contact with the surface of a cation exchange membrane, or to have a gap of 3 mm or lower from the surface of the ion exchange membrane. On the catalytic layer of the anode and the cathode, chloride ions react with water to form chlorine gas and sodium hydroxide. Anodic reaction and cathodic reaction are as follows, respectively.

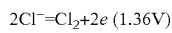

$2Cl^-=Cl_2+2e$ (1.36V)

$2H_2O+2e=2OH^-+H_2$ (−0.83V)

Theoretical decomposition voltage is 2.19V.

However, where the conventional cathode is operated at a large current density, there are some large problems, for example, as follows.

(1) Part of a substrate (nickel, iron or carbon component) dissolves and peels due to deterioration of an electrode, and such a component migrates into a catholyte, a membrane or an anode chamber, resulting in deterioration of product quality and deterioration of electrolysis performance.
(2) Overvoltage increases with increasing a current density, resulting in decreasing energy efficiency.
(3) Distribution of gas bubbles in a cell increases with increasing a current density, resulting in causing distribution in concentration of sodium hydroxide formed. As a result, solution resistance loss of a catholyte increases.
(4) Where operating conditions are severe, the amount of impurities (sulfur, iron or the like) effused from a cell constituting material increases, resulting in contamination of an electrode.

It is expected that a constitution that an activated cathode for hydrogen evolution is arranged so as to closely contact with an ion exchange membrane (zero gap) can decrease voltage and such a constitution is desirable. However, this constitution has the possibility that a membrane is mechanically broken by a cathode having a rough surface. Thus, there has been the problem to use the conventional cathode at a high current density and under zero gap condition.

In order to solve the above-mentioned problems, encountered when the activated cathode by the conventional methods are used, the inventors of the present invention have developed an activated cathode for hydrogen evolution, as shown below, as the one by the thermal decomposition process.

(1) An activated cathode with the mixed catalyst of cerium and precious metal coated on the surface of nickel substrate (Patent Literature 1)
(2) An activated cathode with a precious metal coating layer and a cerium coating layer laminated on the surface of nickel substrate (Patent Literature 2)
(3) An activated cathode with a base coating layer of a nickel oxide as a chief element as a base coating layer for a mixed catalyst of rare earth elements, such as lanthanum and cerium, and a precious metal (Patent Literature 3)
(4) An activated cathode comprising silver and a platinum group metal (Patent Literature 4)
(5) An activated cathode comprising 3 elements of platinum, ruthenium, and cerium (Patent Literature 5)
(6) An activated cathode comprising 3 elements of platinum, cerium, and lanthanum (Patent Literature 6)

Conventionally, the following activated cathodes for hydrogen evolution have been publicly opened as those by the thermal decomposition process.

(7) A mixed catalyst of ruthenium and cerium being manufactured in presence of oxalic acid. (Patent Literature 7)
(8) An activated cathode applying ruthenium nitrate and lanthanum carboxylate (Patent Literature 8)
(9) An activated cathode with an alloy of a transition metal like nickel and platinum or amorphous materials deposited on a conductive substrate (Literature 9, 10, and 11)

The activated cathode for hydrogen evolution manufactured by the thermal decomposition process applying precious metals as catalyst, as above, may be satisfactory in performance, but there is the problem in cost and it is essential to decrease the amount of precious metals used. In this case, however, thickness of the catalyst layer is small, and the overvoltage performance degrades within a normal life period of a cation exchange membrane or the substrate tends to dissolve. In addition, decreased amount of catalyst tends to accelerate deterioration of electrolysis performance at a high current density due to consumed catalyst.

Moreover, in this kind of an activated cathode for hydrogen evolution, an initial value of hydrogen overvoltage is high, and in order to keep it low for a long-time stable operation, further improvement is still required. In particular, in case of ruthenium applied as precious metal, a disadvantage lies in the fact that catalyst element consumes during a cease of operation for short-circuiting. Furthermore, in a chlor-alkali electrolysis cell by an ion exchange membrane process and the like, overvoltage performance tends to degrade easily when the electrolytic cell is contaminated with impurities in electrolyte.

CITATION LIST

Patent Literature

PTL 1: Japanese Examined Patent Application Publication No. 6-33481
PTL 2: Japanese Examined Patent Application Publication No. 6-33492
PTL 3: Japanese Patent No. 4142191
PTL 4: Japanese Patent No. 4341838
PTL 5: Japanese Unexamined Patent Application Publication No. 2006-193768
PTL 6: Japanese Unexamined Patent Application Publication No. 2009-215580
PTL 7: Japanese Patent No. 4346070
PTL 8: Japanese Patent No. 4274489
PTL 9: Japanese Unexamined Patent Application Publication No. 2005-330575
PTL 10: Japanese Unexamined Patent Application Publication No. 2006-118022
PTL 11: Japanese Unexamined Patent Application Publication No. 2006-118023

Non Patent Literature

NPL 1: Electrochemical Hydrogen Technologies p. 15-62, 1990, H. Wendt, U.S. Pat. No. 4,801,368, J. Electrochem. Soc., 137,1419 (1993), Modern Chlor-Alkali Technology, Vol. 3, 1986

SUMMARY OF INVENTION

Technical Problem

The present invention aims to provide an activated cathode for hydrogen evolution by improving an activated cathode for hydrogen evolution comprising a mixed catalyst of a precious metal like platinum and a rare earth element like cerium prepared by a thermal decomposition process, solving afore-mentioned problems of the conventional technologies, and achieving an activated cathode for hydrogen evolution which can also be used in a zero-gap cell, be in service for a long time at a low overvoltage being maintained, keep a high remaining rate of the catalyst element even after operation stop by short-circuiting and electrolysis operation at a high current density with a little loss of catalyst, be insusceptible to contamination by electrolyte impurities, and be of low cost.

Solution to Problem

As the first means to solve the problems by the present invention to achieve the afore-mentioned aims, in a cathode for hydrogen evolution with a catalyst layer formed on the cathode substrate, the catalyst later has, at least, 3 elements of platinum, cerium and palladium, as essential element, in state of metal, metal oxide, or hydroxide, contained, when the mole fraction of respective element being x, y, z, within a range of 5 mol %≤x≤90 mol %, 5 mol %≤y≤55 mol %, 5 mol %≤z≤65 mol %.

As the second means to solve the problems by the present invention, lanthanum, in state of metal, metal oxide or metal hydroxide, is added to the catalyst layer having at least the 3 elements, as essential element, of platinum, cerium and palladium, as having at least 4 elements as essential element.

As the third means to solve the problems by the present invention, any platinum group metal other than platinum and palladium, in state of metal, metal oxide or metal hydroxide, is added to the catalyst layer having at least the 3 elements or the 4 elements, as essential element, as having at least 4 elements, 5 elements.

As the fourth means to solve the problems by the present invention, at least one of other rare earth element, in state of metal, metal oxide or metal hydroxide, is added to the catalyst layer having at least the 3 elements, the 4 elements, the 5 elements, as essential element, as having at least 4 elements, 5 elements or 6 elements.

As the fifth means to solve the problems by the present invention, misch metal is applied as cerium.

As the sixth means to solve the problems by the present invention, the catalyst layer comprises a plurality of layers, having the under catalytic coating layer formed on the cathode substrate surface and a top catalytic coating layer formed on the under catalytic coating layer, with almost all quantity of palladium element contained in the top catalytic coating layer.

Advantageous Effects of Invention

The activated hydrogen evolving cathode for chlor-alkali electrolysis by the present invention is superior in electrolysis properties, enabling a long-time stable operation with hydrogen overvoltage maintained at 90 mV or below when operated at a current density of 5 kA/m$^2$ (hereafter, overvoltage at 5 kA/m$^2$), keeping a high remaining rate of the catalyst element after a cease of operation for a short-circuiting and after an electrolysis operation at a high current density, restricting catalyst loss, and having a strong resistance to contamination by electrolytic impurity elements. Moreover, by the present invention, if the catalyst layer comprises layers of two or more having an under catalytic coating layer formed on the cathode substrate surface and a top catalytic coating layer formed on the under catalytic coating layer, and almost all quantity of palladium element is impregnated in the top catalytic coating layer, the catalyst remaining rate after the short-circuiting shut-down test increases, and the property of shut-down resistance can be enhanced.

DESCRIPTION OF EMBODIMENTS

Figure 1:
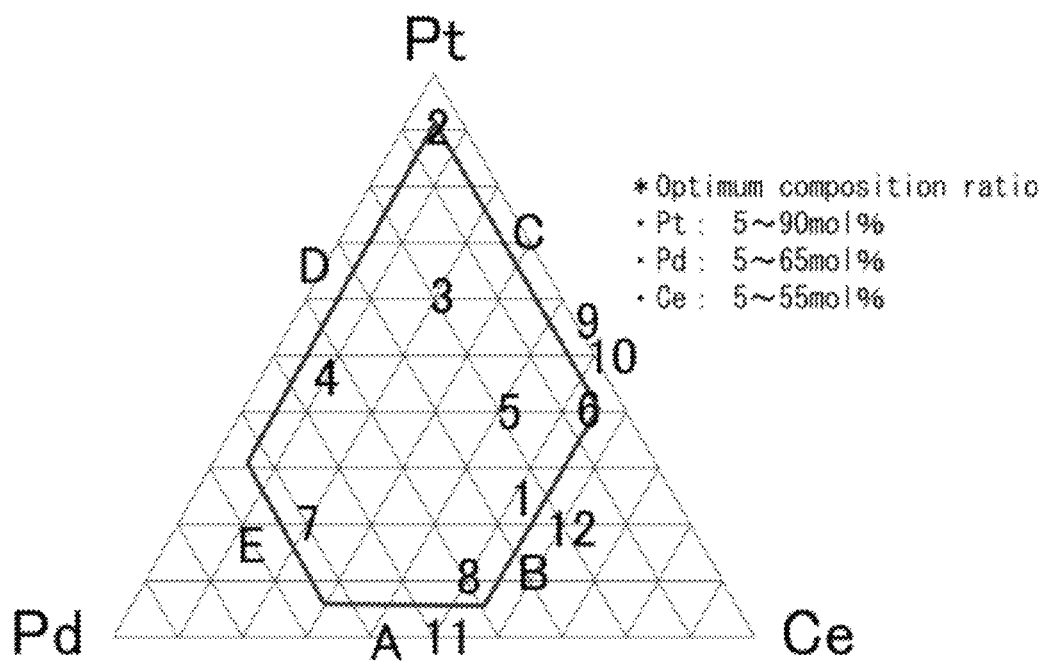
FIG. 1 is a ternary diagram illustrating a composition ratio of a hydrogen evolving cathode by the present invention.

The present invention is described in detail as below.
The inventors of the present invention have found a cathode for chlor-alkali electrolytic cells, etc. by an ion exchange membrane process which shows a high stability in a long time service, maintaining a low cell voltage when palladium, as precious metal catalyst, is mixed to the mixed catalyst of platinum and cerium.

The construction and the manufacturing method of an activated cathode for hydrogen evolution by the present invention are as follows.

The cathode substrate used preferably comprises stainless steel, titanium, nickel or a carbonaceous material in view of electric conductivity and chemical stability. The substrate has a thickness of preferably 0.05-5 mm, and a porosity of preferably 10-95%. The catalyst layer by the present invention is not limited to a substrate with a smooth surface, but can also be applied to the substrate with rough surface like Raney nickel. The following explains a cathode substrate by nickel. The nickel substrate is preferably subjected to surface roughening treatment in order to increase adhesion between the substrate and the catalyst layer. Examples of the surface roughening method include conventional methods, such as a blast treatment by spraying alumina powder, an etching method using soluble acid, and a plasma spray coating method. Chemical etching treatment may further be applied to the roughened surface right before the coating of catalyst layer to remove contaminant particles such as metals or organic materials remaining on the surface. The amount of nickel substrate consumed after the surface roughening treatment and chemical etching treatment is preferably 0.5-200 g/m$^2$.

In the present invention, an oxide base coating layer is preferably formed before formation of the catalyst layer. The base coating layer can be formed by merely subjecting the substrate to heat treatment, thereby reacting nickel with oxygen in air to form $Ni_{(1-x)}O$. The heat treatment temperature is preferably 350-550 deg. Cesium and the baking time is preferably 5-60 minutes.

Oxides formed have generally oxygen defect, although depending on the production conditions, and therefore, generally have p-type semiconductivity. Where thickness of the oxide is too large, resistance loss increases, and on the other hand, where it is too small, only heterogeneous surface layer is obtained. Optimum thickness is about 0.1-100 μm. The base coating layer is preferably formed on the surface of the substrate uniformly such that metal of the cathode substrate does not contact with an alkaline aqueous solution which is an electrolyte.

Other than the formation of the base coating layer by merely heat treating the substrate, the base coating layer can be formed by coating a solution containing nickel ions to the substrate, and then heat treating the thus treated substrate in the same manner as above. When this formation method is employed, a solution having a composition which erodes the cathode substrate is preferably used. The nickel material in the solution is, for example, nickel nitrate, nickel sulfate or nickel chloride. The material nickel is added to nitric acid or hydrochloric acid, and the resulting aqueous solution after adjusting to a suitable concentration can be used as a coating solution.

The oxide layer is obtained by coating the solution, followed by drying and thermal decomposition.

Even when the substrate comprises nickel, a conductive oxide base coating layer comprising other components can be formed. A chemical compound that is stable to an alkali, and has hydrogen evolution ability extremely smaller than that of the catalyst on the surface of the substrate, which therefore can be disregarded, for example, n-type titanium oxide ($TiO_{2-x}$), can be used as the base coating layer.

The catalyst layer comprises platinum, cerium and palladium as essential element, as afore-mentioned. Cerium and palladium are present in the catalyst layer as in metal, metal oxide or hydroxide, and platinum is present in the catalyst layer as in metal, forming a metal layer, an oxide mixed layer, a hydroxide mixed layer or an alloy layer. The catalyst layer is deposited on the base coating layer or the substrate with platinum, palladium compound and cerium preferably uniformly mixed.

The present invention provides a hydrogen evolving cathode comprising, at least, three specific elements, as aforementioned, as essential elements, through the use of which highly stable conditions can be maintained ever after the electrolysis operation at a high activity for relatively a long time.

The inventors of the present invention have found, through experiments using a variety of metals as catalyst with a different composition range applied, that the catalyst ingredient and the composition range of the catalyst elements which enable hydrogen overvoltage to be 90 mV or below are the range enclosed by the segment A, B, C, D, and E of the ternary diagram in FIG. 1. More in detail, the range is the internal region of the pentagon formed by the ranges: 5 mol %≤x≤90 mol %, 5 mol %≤y≤55 mol %, and 5 mol %≤z≤65 mol %, where the mole fraction of platinum, cerium, and palladium is expressed as x, y, and z, respectively.

These composition ranges are the values obtained through reading the range of the pentagon of FIG. 1 by element, and the ternary diagram is prepared by the data shown in Examples and Comparative Examples to be described.

The cathode having a catalyst layer with the composition range that is enclosed by A, B, C, D, and E gave 90 mV or below of hydrogen overvoltage, and showed such properties as a low hydrogen overvoltage, a high stability to short-circuiting, or a high poison resistance, compared with a cathode having a catalyst layer with a composition range outside the region.

Whereas, in case that the respective mole fraction of platinum, cerium, and palladium is smaller than 5 mol %, or the mole fraction of cerium is 55 mol % or more, or the mole fraction of palladium is 65 mol % or more, the hydrogen overvoltage became 100 mV or more in all cases, and what was worse, the remaining ratio of catalyst element after short-circuiting shut-down or after an electrolysis operation at a high current density was low, and the poison resistance was also low. In case of platinum, both the hydrogen overvoltage and the remaining ratio of catalyst element after short-circuiting shut-down or after an electrolysis operation at a high current density were satisfactory, even the mole fraction was 90 mol %, but the cost was too high to be applied industrially.

In the present invention, it is also possible that lanthanum in a form of metal, metal oxide or metal hydroxide is added to the catalyst layer having at least the three elements of platinum, cerium, and palladium as essential element, to prepare the catalyst layer having four elements as essential element.

In the present invention, it is also possible that a platinum group metal other than platinum and palladium, such as ruthenium in a form of metal, metal oxide or metal hydroxide is added to the catalyst layer having the above three or four elements as essential element, to prepare the catalyst layer having four, five or more elements.

In the present invention, it is also possible that a rare earth element, such as praseodymium, is added to the catalyst layer having four, five or more elements as essential element.

In the present invention, it is also possible that misch metal is applied to the catalyst layer having the afore-mentioned four, five or more elements as essential element or the catalyst layer cerium with additionally added other rare earth element. Misch metal is a mixed material of cerium group rare earth metals (light rare earth), including Ce 40-50%, La 20-40%, and Pr, Nd, Sm, Gd, and also a trace impurities of Fe, Al, Mg, and Si. ("KIDORUI NO KAGAKU"—Science of Rare Earth, published by Kagaku-Dojin Publishing Co.)

Moreover, in the present invention, the catalyst layer preferably comprises a laminate of a plurality of layers comprising an under catalytic coating layer formed on the cathode substrate surface and a top catalytic coating layer formed on the under catalytic coating layer, with almost all quantity of palladium element impregnated in the top catalytic coating layer. It is also possible that a small amount of palladium element is contained in the under catalytic coating layer. When the catalyst layer is of a laminated structure, if platinum element is impregnated at 15 mol % or more, the catalyst layer can improve its adhesiveness to the cathode substrate or the base coating layer.

When the catalyst layer of such a laminated structure contains much amount of palladium in the under catalytic coating layer, the catalyst layer tends to cause peeling and fall off at the shut-down of operation. On the other hand, if the catalyst layer contains almost no palladium in the under catalytic coating layer, such phenomenon as peeling disappears and the catalyst remaining rate after the short-circuiting test increases and resistance to a peeling-off at shut-down can be improved.

The catalyst layer, in whole, has a porous structure, and unless the base coating layer exists, electrolyte permeates, causing the substrate to consume. However, depending on duration of operation or a kind of application, provision of the base coating layer is not always required.

The catalyst layer is preferably formed by the thermal decomposition process such that similar to an anode DSE (Trademark by Permelec Electrode Ltd.) generally used in brine electrolysis, a salt solution of the catalyst metal is applied to a substrate surface, and baked. When the catalyst layer is formed by baking, a solution containing catalyst ions reacts with a substrate, nickel substrate element permeates into the catalyst layer to dissolve as an oxide or a hydroxide, and this may adversely affect the membrane or the anode. However, the presence of the base coating layer can prevent this corrosion.

As material palladium used for the catalyst layer, such palladium compounds are applicable as diammine dinitro palladium, metal palladium, palladium oxide, palladium chloride, nitric acid palladium, palladium alkoxide, and bis (acetylacetonato)palladium, which are added to nitric acid, hydrochloric acid, or water to prepare an aqueous solution with a suitable concentration of coating solution. In case of platinum, chloroplatinic acid, diammine dinitro platinum, etc. can be the material, which are added to nitric acid, hydrochloric acid, or water to prepare an aqueous solution with a suitable concentration of coating solution.

In case of cerium, metal cerium, cerium chloride, cerium nitrate, etc. can be the material, which are added to nitric acid, hydrochloric acid, or water to prepare an aqueous solution with a suitable concentration of coating solution.

These coating solutions can be applied to the substrate or the base coating layer either separately or as a mixture of three kinds of coating solutions. The quantity of the coating solutions is controlled so that the composition ratio among platinum, palladium and cerium stays within the range enclosed by ABCDE shown in FIG. 1.

The substrate applied with the coating solution is dried at 40-150 deg. Celsius for 5-20 minutes, and then subjected to heat decomposition reaction (baking). The heat decomposition temperature is preferably 300-650 deg. Celsius, and the baking time is preferably 5-60 minutes. The weight of the catalyst is preferably about 1-15 g/m$^2$, and the thickness of the catalyst layer is preferably 0.1-10 μm.

When the afore-mentioned hydrogen evolving cathode is used in a brine electrolysis, a perfluorinated membrane is preferably used as an ion exchange membrane from the standpoint of corrosion resistance. An anode preferably used in the electrolysis is a titanium-based insoluble electrode containing a noble metal oxide, called DSE (Trademark by Permelec Electrode Ltd.). The anode is preferably porous so as to use the same with close contact with a membrane. Where the hydrogen evolving cathode is required to closely contact with a membrane, the cathode and the membrane are previously mechanically bound or pressure is applied in conducting electrolysis. The pressure applied is preferably 0.1-1 kgf/cm$^2$. Electrolysis conditions are preferably that the temperature is 60-95 deg. and the current density is 3-10 kA/m$^2$.

The catalyst layer can be coated on an existing cathode with a low or decreased activity. In such case, fouling on the catalyst surface, which will be a base coating layer, is cleaned by the afore-mentioned methods, and coating and baking are applied.

EXAMPLES

The present invention is described more in detail by reference to the following Examples, but it should be understood that the invention is not construed as being limited thereto.

Example 1

Nickel mesh was used as a cathode substrate. Surface of the substrate was roughened with alumina particles adequately, and then dipped in an etching solution for 5 minutes. The etching solution was prepared in such a manner that 36% HCl was mixed with an equivalent amount of pure water, boiled once and cooled down to 25 deg. Celsius.

For making a coating solution, diammine dinitro platinum (II) HNO$_3$ soln., diammine dinitro palladium(II) HNO$_3$ soln., and cerium(III)nitrate hexahyrate are mixed at a composition ratio of Pt:Pd:Ce=25:25:50 mol % so as to obtain the liquid concentration, respectively, as 20.8 g/l, 14.4 g/l, and 34.0 g/l.

Using a roller, this coating solution is applied to the nickel mesh so that the Pt and Pd coating amount (hereafter, the precious metal coating amount is called the NM coating amount) per time becomes 0.6 g/m$^2$. The nickel mesh was dried at 60 deg. Celsius for 10 minutes and baked in an electric furnace at 500 deg. Celsius for 13 minutes. This treatment was repeated four times to make the catalyst layer with the final NM coating amount to 2.6 g/m$^2$. Thus, Cathode Sample for hydrogen evolution No. 1 was prepared.

As an anode, titanium-made DSE (Trademark by Permelec Electrode Ltd.) was used and as an ion exchange membrane, Aciplex (Trademark by Asahi Kasei Chemicals) F6801 was used. An electrolytic cell was configured with the cathode closely contacted with one side of the membrane, and the porous anode closely contacted with the other side of the membrane. A saturated sodium chloride aqueous solution was supplied as anolyte at a rate of 4 ml/min., and pure water was supplied to the cathode at a rate of 0.4 ml/min. It was confirmed by ICP that impurities like iron were present in the cathode alkaline solution at about 0.5 ppm. In the cathode wherein the temperature was set to 90 deg.Celsius, the initial cathode overvoltage at a current density of 5 kA/m² was 75 mV. The remaining rates of the catalytic elements after the short-circuiting test were Pt: approx. 70%, Pd: 30% and Ce: approx. 90%. After the electrolysis test at a high current density, the remaining rates were: Pt: approx. 100%, Pd: 100% and Ce: approx. 80%.

In Cathode Sample No. 1 for hydrogen evolution, the remaining rate of platinum (Pt), which is the most important element to keep hydrogen overvoltage to be low, was extremely high, and thus, even in the operation with short-circuiting and at a high current density, a long service life with low hydrogen overvoltage was obtained.

Regarding the present invention, the short-circuiting test was such that after one-hour operation at 10 kA/m², electrolysis operation was suspended in short-circuiting state for one hour, and such a cycle of the electrolysis operation—short-circuiting stoppage was repeated ten times. A high current density test means an electrolysis operation at a current density of 15 kA/m² for 350 hours.

Examples 2-8

In Cathode Samples for hydrogen evolution No. 2-8, the composition ratio of three-element type catalyst comprising platinum (Pt), palladium (Pd) and cerium (Ce) and the NM coating amount were changed and other than those, the cathode samples for hydrogen evolution were prepared by the same method as Example 1. In Cathode Samples for hydrogen evolution No. 2-8, the composition ratio of platinum (Pt) was decremented one by one. The test results were as shown in Table 1. In all samples, the initial overvoltage at 5 kA/m² was below 90 mV.

As with Cathode Sample for hydrogen evolution No. 1, these Cathode Samples for hydrogen evolution No. 2-8 showed all good result in the remaining rate of the catalyst element after the short-circuiting test and the high current density test. In particular, the remaining rate of platinum (Pt), which is the most important element to keep hydrogen overvoltage to be low, was extremely high and even for the operation with short-circuiting and at a high current density, a long service life with low hydrogen overvoltage was obtained.

TABLE 1

| | Sample | Composition ratio (mol %) | | | NM coating amount | SEP@5 kA/m² |
|---|---|---|---|---|---|---|
| | No. | Pt | Pd | Ce | (g/m²) | (mV) |
| Example 1 | 1 | 25 | 25 | 50 | 2.6 | 75 |
| Example 2 | 2 | 90 | 5 | 5 | 2.7 | 88 |
| Example 3 | 3 | 60 | 20 | 20 | 2.3 | 86 |
| Example 4 | 4 | 45 | 45 | 10 | 2.5 | 84 |
| Example 5 | 5 | 40 | 20 | 40 | 2.7 | 77 |
| Example 6 | 6 | 40 | 10 | 50 | 2.2 | 86 |
| Example 7 | 7 | 20 | 60 | 20 | 2.6 | 83 |
| Example 8 | 8 | 10 | 40 | 50 | 2.5 | 77 |

Comparative Examples 1-4

In Cathode Samples for hydrogen evolution No. 9-12, the composition ratio of platinum (Pt), palladium (Pd) and cerium (Ce) and the NM coating amount were changed and other than those, Cathode Samples for hydrogen evolution No. 9-12 were prepared by the same method as Example 1. Comparative Examples 1, 2, which correspond to Cathode Samples for hydrogen evolution No. 9, 10, were the two-element type catalyst comprising platinum (Pt) and palladium (Pd), and Comparative Example 3, which corresponds to Cathode Sample for hydrogen evolution No. 11, was two-element type catalyst comprising palladium (Pd) and cerium (Ce). Comparative Example 4, which corresponds to Cathode Sample for hydrogen evolution No. 12, was three-element type catalyst comprising platinum (Pt), palladium (Pd) and cerium (Ce), with the composition ratio of cerium (Ce) being 60 mol %, which was the cathode sample for hydrogen evolution being out of scope by the present invention.

Table 2 shows the initial overvoltage at 5 kA/m² of Cathode Samples for hydrogen evolution No. 9-12 corresponding to Comparative Examples No. 1-4.

As shown in Table 2, the results were that the initial overvoltage at 5 kA/m² of Cathode Samples for hydrogen evolution No. 9-12 was 100 mV or more.

TABLE 2

| | Sample | Composition ratio (mol %) | | | NM coating amount | SEP@5 kA/m² |
|---|---|---|---|---|---|---|
| | No. | Pt | Pd | Ce | (g/m²) | (mV) |
| Comparative Example 1 | 9 | 55 | 0 | 45 | 3.2 | 100 |
| Comparative Example 2 | 10 | 50 | 0 | 50 | 2.7 | 113 |
| Comparative Example 3 | 11 | 0 | 50 | 50 | 2.4 | 106 |
| Comparative Example 4 | 12 | 20 | 20 | 60 | 2.5 | 100 |

Study of Examples 1-8 and Comparative Examples 1-4

Experimental data about Cathode Samples for hydrogen evolution No. 1-12 used in Examples 1-8 and Comparative Examples 1-4 are as shown in FIG. 1. It has been proven that Cathode Samples for hydrogen evolution No. 1-8 only, which showed initial overvoltage below 90 mV are included within the range defined by the straight lines by A, B, C, D, E in FIG. 1. It has been proven that the scope by the straight lines A, B, C, D, E corresponds to the scopes in terms of composition of each element by 5 mol %≤x≤90 mol %, 5 mol %≤y≤55 mol %, 5 mol %≤z≤65 mol %, where the mole fractions of platinum, cerium, and palladium are expressed by x, y, z respectively.

Examples 9 and 10

Cathode Samples for hydrogen evolution No. 13 and No. 14 have a different composition ratio of 4-element type catalyst, comprising platinum (Pt), palladium (Pd), cerium (Ce), and lanthanum (La). Other than that, these cathode samples for hydrogen evolution were prepared by the same method as Example 1.

The results were as shown in Table 3. The respective initial overvoltage at 5 kA/m² was 82 mV and 83 mV, both being below 90 mV.

TABLE 3

| Sample | | Composition ratio (mol %) | | | | NM coating amount | SEP@5 kA/m² |
|---|---|---|---|---|---|---|---|
| | No. | Pt | Pd | Ce | La | (g/m²) | (mV) |
| Example 9 | 13 | 25 | 35 | 32 | 8 | 2.6 | 82 |
| Example 10 | 14 | 35 | 25 | 32 | 8 | 2.5 | 83 |

As shown in Table 4, Cathode Samples for hydrogen evolution No. 13 and No. 14 showed good results in the remaining rate of the catalyst element after the short-circuiting test and the high current density test. In particular, the remaining rate of platinum (Pt), which is the most important element to keep hydrogen overvoltage to be low, was extremely high in both samples and even for the operation with short-circuiting and at a high current density, a long service life with low hydrogen overvoltage was obtained.

TABLE 4

| | catalyst remaining rate after short-circuiting test | | | | catalyst remaining rate after high current density test | | | |
|---|---|---|---|---|---|---|---|---|
| | Pt | Pd | Ce | La | Pt | Pd | Ce | La |
| Sample 13 | 85% | 53% | 100% | 100% | 100% | 100% | 80% | 95% |
| Sample 14 | 87% | 52% | 100% | 100% | 98% | 97% | 78% | 94% |

Furthermore, in order to study the effect of contamination caused by electrolyte impurity elements of Cathode Samples for hydrogen evolution No. 13 and 14, an iron poisoning test was conducted under a high contamination condition. As a result, increase in overvoltage was +3 mV and +8 mv, respectively, within a small increase range below 10 mV, showing a superior poisoning resistance. In contrast, Sample No. 11, which is Comparative Example 3 measured for comparison, showed an increase as large as +30 mV, proving poor poisoning resistance.

From the test, it is known that the cathode for hydrogen evolution by the present invention is strongly resistive to contamination by electrolyte impurity elements and can be used for a long time with hydrogen overvoltage maintained to be low under a normal operation condition.

As a condition of the iron poisoning test, electrolysis was conducted for 5 hours at a current density of 5 kA/m² in an electrolyte severely contaminated at 3.0 ppm as iron impurity in 32% caustic soda solution, and an increasing change of overvoltage was measured.

Example 11

A nickel plate was used as a cathode substrate. Surface of the substrate was roughened with alumina particles adequately, and then dipped in an etching solution for 5 minutes. The etching solution was prepared in such a manner that 36% HCl was mixed with an equivalent amount of pure water, boiled once and cooled down to 25 deg. Celsius.

For making a coating solution, diammine dinitro platinum (II) HNO₃ soln., diammine dinitro palladium(II) HNO₃ soln., cerium(III)nitrate hexahydrate and lanthanum(III) nitrate hexahydrate are mixed at a composition ratio of Pt:Pd:Ce:La so as to obtain the liquid concentration, respectively, as 5.9 g/l, 0 g/l, 19.1 g/l, 4.7 g/l. This solution was used as the coating solution for the under catalytic coating layer containing no Pd element. Also, the coating solution for the top-coating was prepared to have the respective concentration as 25.8 g/l, 21.2 g/l, 19.1 g/l, 4.7 g/l. Using a roller, the coating solution for the under catalytic coating layer is applied to the nickel plate so that the NM coating amount becomes 0.1 g/m²-pjt. The nickel substrate was dried at 60 deg. Celsius for 10 minutes and baked in an electric furnace at 500 deg. Celsius for 13 minutes to form the under catalytic coating layer. Then, using a roller, the coating solution for the top catalytic coating layer is applied to the under catalytic coating layer so that the NM coating amount becomes 0.8 g/m²-pjt. The nickel substrate was dried at 60 deg. Celsius for 10 minutes and baked in an electric furnace at 500 deg. Celsius for 13 minutes. Using the coating solution for the top catalytic coating layer, this treatment was repeated three times to make the catalyst layer with the final NM coating amount to 2.5 g/m²-pjt. Thus, Cathode Sample No. 15 for hydrogen evolution was prepared. The composition ratios (mol %) of the under catalytic coating layer and the top catalytic coating layer of Cathode Sample for hydrogen evolution No. 15 were as shown in Table 5. The total composition ratios (mol %) of Cathode Sample for hydrogen evolution No. 15 were the same with Cathode Sample for hydrogen evolution No. 17. This composition ratio (mol %) were the same with Cathode Sample for hydrogen evolution No. 13 used in Example 9.

As anode, titanium-made DSE (Trademark by Permelec Electrode Ltd.) porous anode was used, and as an ion exchange membrane, Aciplex (Trademark by Asahi Kasei Chemicals)-F6801 (manufactured by Asahi Kasei Chemicals) was used. On each surface of the ion exchange membrane, the cathode and the porous anode were adhered tightly to form an electrolytic cell.

Saturated brine, as anolyte, was supplied at a flow rate of 4 ml/min. and pure water was supplied to the cathode at 0.4 ml/min. From an ICP analysis, it was confirmed that the cathode alkaline solution contained impurities like iron at around 0.5 ppm. In the cathode wherein the temperature was set to 90 deg.Celsius, the initial cathode overvoltage was 81 mV at 5 KA/m².

Figure 2:
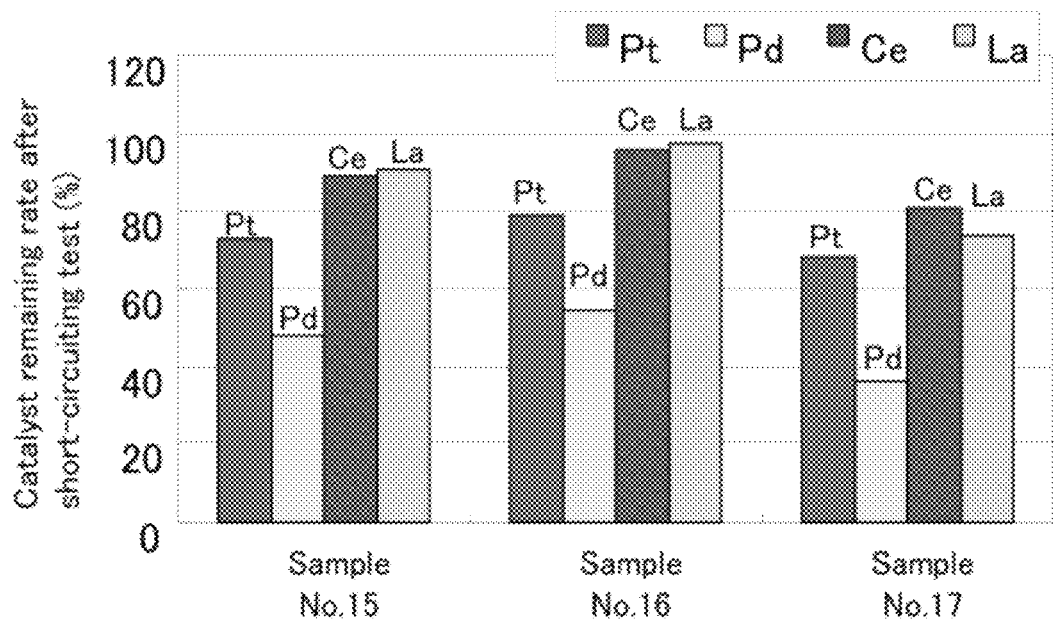
FIG. 2 shows a catalyst remaining rate after a short-circuiting test of the hydrogen evolving cathode in accordance with an embodiment of the present invention.

As known from Table 5 and FIG. 2, the results of Cathode Sample for hydrogen evolution No. 15 showed that the initial overvoltage was 81 mV, the remaining rate after short-circuiting test was Pt:Pd:Ce:La=73%:48%:89%:91%, proving that the catalyst remaining rate after the short-circuiting test was enhanced compared with Cathode Sample for hydrogen evolution No. 17 with a single layer structure.

Example 12

In Cathode Sample for hydrogen evolution No. 16, the composition ratio of the 4-element type catalyst:platinum (Pt), palladium (Pd), cerium (Ce) and lanthanum (La) and coating times of the under catalytic coating layer and the top catalytic coating layer were changed. Other conditions than those were the same with Example 11 for fabricating the cathode sample for hydrogen evolution.

As known from Table 5 and FIG. 2, the results of Cathode Sample for hydrogen evolution No. 16 showed that the initial overvoltage was 82 mV, the remaining rate after short-circuiting test was Pt:Pd:Ce:La=79%:55%:96%:98%, proving that the catalyst remaining rate after the short-circuiting test was enhanced compared with Cathode Sample for hydrogen evolution No. 17 with a single layer structure.

TABLE 5

| Layer Structure | | Composition ratio (mol %) | | | | Number of coating (time) | NM coating amount (g/m²-pjt) | SEP@5 kA/m² | Catalyst remaining rate after short-circuiting (%) | | | |
|---|---|---|---|---|---|---|---|---|---|---|---|---|
| | | Pt | Pd | Ce | La | | | | Pt | Pd | Ce | La |
| Sample No. 15 | Under catalytic coating layer | 15 | 0 | 68 | 17 | 1 | 2.1 | 81 | 73 | 48 | 89 | 91 |
| | Top catalytic coating layer | 26 | 36 | 27 | 7 | 3 | | | | | | |
| Sample No. 16 | Under catalytic coating layer | 15 | 0 | 68 | 17 | 2 | 2.6 | 82 | 79 | 55 | 96 | 98 |
| | Top catalytic coating layer | 28 | 39 | 21 | 5 | 2 | | | | | | |
| Sample No. 17 | Single layer | 25 | 35 | 32 | 8 | 4 | 2.7 | 82 | 68 | 37 | 81 | 74 |

INDUSTRIAL APPLICABILITY

The present invention relates to a cathode for hydrogen evolution, applicable more preferably as the most suitable cathode for hydrogen evolution used in the industrial electrolyses including chlor-alkali electrolysis.

The invention claimed is:

1. A cathode for hydrogen evolution, comprising a catalyst layer formed on a cathode substrate, the catalyst layer comprising platinum, cerium and palladium in a state of metal, metal oxide, or hydroxide, contained within a range of 5 mol %≤x≤90 mol %, 5 mol %≤y≤55 mol %, 5 mol %≤z≤65 mol %, where the mole fractions of platinum, cerium, and palladium respectively are x, y, and z, wherein the catalyst layer comprises a plurality of layers, having an under catalytic coating layer comprising platinum and cerium, and a top catalytic coating layer comprising platinum, cerium and palladium formed on the under catalytic coating layer, with palladium not being present when the under catalytic coating layer is formed, wherein there is more palladium in the top catalytic layer than in the under catalytic layer.

2. The cathode for hydrogen evolution according to claim 1, wherein lanthanum, in a state of metal, metal oxide, or hydroxide, is present in the catalyst layer.

3. The cathode for hydrogen evolution according to claim 1, wherein at least one platinum group metal, in a state of metal, metal oxide, or hydroxide, other than platinum and palladium, is present in the catalyst layer.

4. The cathode for hydrogen evolution according to claim 1, wherein at least one rare earth element other than cerium, in a state of metal, metal oxide, or hydroxide, is present in the catalyst layer.

5. The cathode for hydrogen evolution according to claim 1, wherein the cerium is present in misch metal.

6. The cathode for hydrogen evolution according to claim 1, which has a hydrogen overvoltage level below 90 mV at a current density of 5 kA/m².

* * * * *